United States Patent
Chen et al.

(10) Patent No.: US 11,226,875 B2
(45) Date of Patent: Jan. 18, 2022

(54) SYSTEM HALT EVENT RECOVERY

(71) Applicant: International Business Machines Corporation, Armonk, NY (US)

(72) Inventors: Lior Chen, Jerusalem (IL); Daniel Gan-Levi, Modiin (IL); Ronen Gazit, Tel-Aviv (IL); Deborah A. Messing, Beit Sehemesh (IL)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 15/655,598

(22) Filed: Jul. 20, 2017

(65) Prior Publication Data

US 2019/0026195 A1    Jan. 24, 2019

(51) Int. Cl.
*G06F 11/00* (2006.01)
*G06F 11/14* (2006.01)

(52) U.S. Cl.
CPC ...... *G06F 11/1471* (2013.01); *G06F 11/1438* (2013.01); *G06F 11/1441* (2013.01); *G06F 2201/805* (2013.01); *G06F 2201/82* (2013.01)

(58) Field of Classification Search
CPC ............. G06F 11/1438; G06F 11/1402; G06F 11/1471; G06F 11/1441; G06F 2201/805; G06F 2201/82
See application file for complete search history.

(56) References Cited

U.S. PATENT DOCUMENTS

| | | | |
|---|---|---|---|
| 5,339,407 A | 8/1994 | Goldman et al. | |
| 6,996,733 B2 | 2/2006 | Hershenson et al. | |
| 7,174,451 B2* | 2/2007 | Zimmer | G06F 9/4416 713/2 |
| 7,490,268 B2 | 2/2009 | Keromytis et al. | |
| 7,941,700 B2* | 5/2011 | Schlesinger | G06F 11/1482 714/15 |
| 8,074,019 B2* | 12/2011 | Gupta | G06F 11/1435 711/114 |
| 8,458,517 B1* | 6/2013 | Vermeulen | G06F 11/1474 709/201 |
| 9,164,846 B2* | 10/2015 | Lang | G06F 11/1441 |
| 2002/0035706 A1* | 3/2002 | Connor | G06F 11/1469 714/15 |
| 2004/0193863 A1* | 9/2004 | Zimmer | G06F 9/4416 713/1 |
| 2005/0283504 A1* | 12/2005 | Suzuki | G06F 11/2025 |
| 2007/0271313 A1* | 11/2007 | Mizuno | G06F 11/1662 |

(Continued)

FOREIGN PATENT DOCUMENTS

CN    101308471 B    12/2011

*Primary Examiner* — Jonathan D Gibson

(74) *Attorney, Agent, or Firm* — Zilka-Kotab, P.C.

(57) ABSTRACT

A computer-implemented method, according to one embodiment, includes: storing information in a specified system memory location, attaching an external process to the specified system memory location in response to experiencing a system halt event, sending the information stored in the specified system memory location to a memory location associated with the external process, restarting the system in a recovery mode, retrieving the information from the external process, and using the retrieved information to restore the system to a state the system was in when the system halt event occurred. Other systems, methods, and computer program products are described in additional embodiments.

20 Claims, 7 Drawing Sheets

(56) References Cited

U.S. PATENT DOCUMENTS

2012/0011397 A1* 1/2012 Murakami .......... G06F 11/0712
714/15
2017/0308440 A1* 10/2017 Earurnthavadi .... G06F 11/1438

* cited by examiner

SYSTEM HALT EVENT RECOVERY

BACKGROUND

The present invention relates to data storage, and more specifically, this invention relates to data storage configurations for restoring a system from system halt events.

Enterprise storage products are typically subjected to an extremely high reliability and data integrity standards. Current industry standard call for a mean time between failures (MTBF) which corresponds to conventional storage products being in uptime between 99.9999% and 99.999% of the time. Another important factor includes how the storage products behave in fatal failure scenarios which the system was not designed to cope with, such as multiple software nodes or concurrent server failures. Conventional enterprise storage products with capacities in the petabyte (PB) range would take days, or even weeks, to recover from back-up following a fatal failure scenario.

Therefore attempts have been made to utilize recovery tools to repair a storage product and avoid recovering from back-ups. However, repairing a storage product using recovery tools is undesirable as well, as doing so typically result in substantial data and metadata loss. Efforts to overcome this loss by continually back-up the data and metadata to persistent storage has severe performance impact on the system, and in most cases is not even a viable option.

Alternatively, efforts have been made to periodically store a snapshot of the data and/or metadata in a storage product and subsequently use a latest snapshot to reconstruct the product after a failure event. However, all data and/or metadata created, updated, deleted, etc. between the point in time the latest snapshot was taken and the failure event occurred is permanently lost. Thus, depending on the frequency at which snapshots are taken, a significant amount of data and/or metadata may be lost for a given system.

It follows that conventional products leave the customer with a tough choice of weighing product downtime during recovery with data loss and application inconsistency.

SUMMARY

A computer-implemented method, according to one embodiment, includes: storing information in a specified system memory location, attaching an external process to the specified system memory location in response to experiencing a system halt event, sending the information stored in the specified system memory location to a memory location associated with the external process, restarting the system in a recovery mode, retrieving the information from the external process, and using the retrieved information to restore the system to a state the system was in when the system halt event occurred.

A computer program product, according to another embodiment, includes a computer readable storage medium having program instructions embodied therewith. The computer readable storage medium is not a transitory signal per se, and the program instructions readable and/or executable by a processor to cause the processor to perform a method which includes: storing, by the processor, information in a specified system memory location; attaching, by the processor, an external process to the specified system memory location in response to experiencing a system halt event; sending, by the processor, the information stored in the specified system memory location to a memory location associated with the external process; restarting, by the processor, the system in a recovery mode; retrieving, by the processor, the information from the external process; and using, by the processor, the retrieved information to restore the system to a state the system was in when the system halt event occurred.

A computer-implemented method, according to yet another embodiment, includes: attaching to a specified system memory location in response to detecting that a system halt event occurred at the system, extracting information stored in the specified system memory location, storing the information in local memory, and sending the information back to the specified system memory location in response to detecting that the system has been restarted in a recovery mode.

Other aspects and embodiments of the present invention will become apparent from the following detailed description, which, when taken in conjunction with the drawings, illustrate by way of example the principles of the invention.

DETAILED DESCRIPTION

Figure 1:
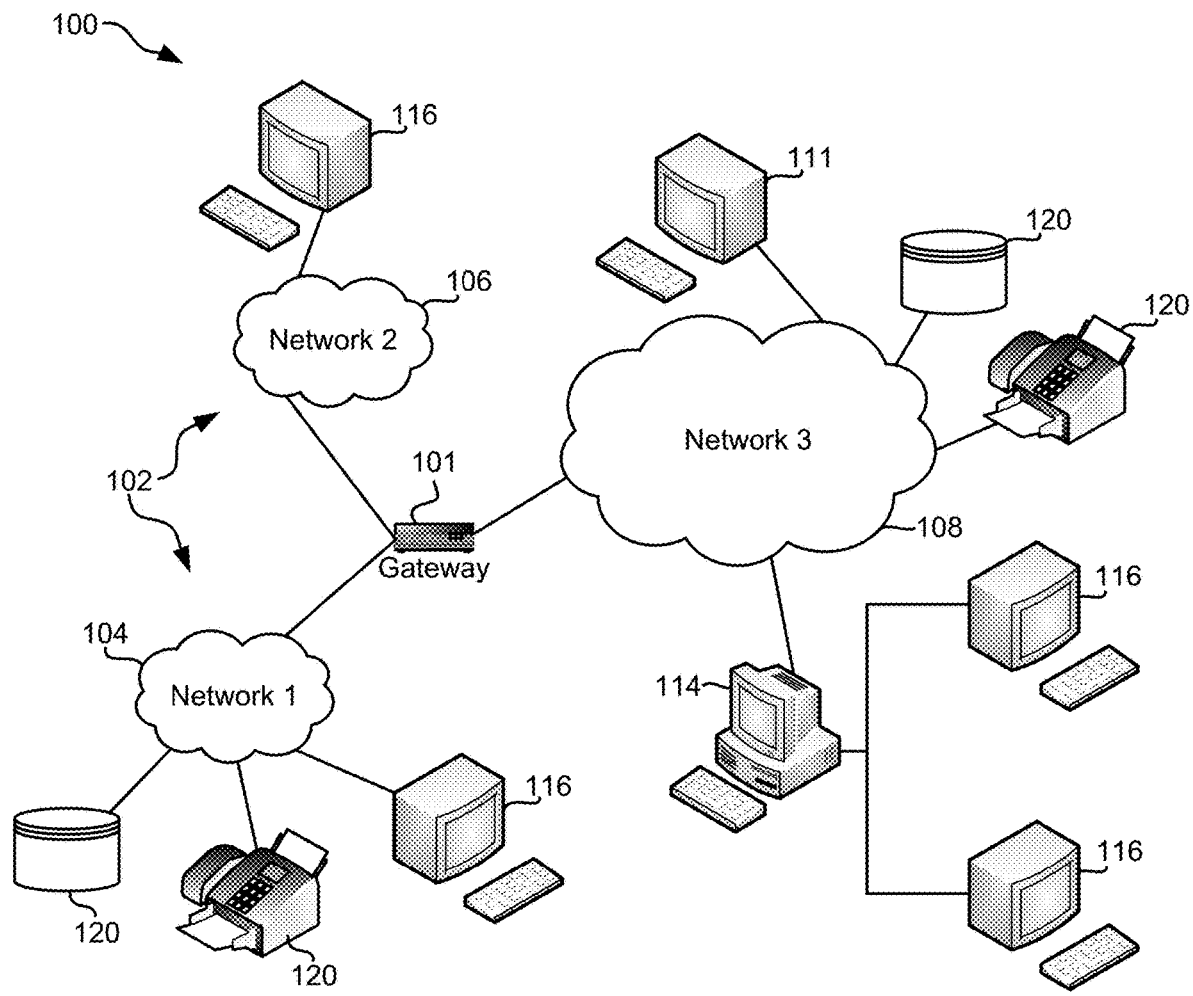
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for recovering from a system halt event. Some of the embodiments described herein are desirably able to provide loss-less system recovery procedures by maintaining a specified system memory location, e.g., as will be described in further detail below.

In one general embodiment, a computer-implemented method includes: storing information in a specified system memory location, attaching an external process to the specified system memory location in response to experiencing a system halt event, sending the information stored in the specified system memory location to a memory location associated with the external process, restarting the system in a recovery mode, retrieving the information from the external process, and using the retrieved information to restore the system to a state the system was in when the system halt event occurred.

In another general embodiment, a computer program product includes a computer readable storage medium having program instructions embodied therewith. The computer readable storage medium is not a transitory signal per se, and the program instructions readable and/or executable by a processor to cause the processor to perform a method which includes: storing, by the processor, information in a specified system memory location; attaching, by the processor, an external process to the specified system memory location in response to experiencing a system halt event; sending, by the processor, the information stored in the specified system memory location to a memory location associated with the external process; restarting, by the processor, the system in a recovery mode; retrieving, by the processor, the information from the external process; and using, by the processor, the retrieved information to restore the system to a state the system was in when the system halt event occurred.

In yet another general embodiment, a computer-implemented method includes: attaching to a specified system memory location in response to detecting that a system halt event occurred at the system, extracting information stored in the specified system memory location, storing the information in local memory, and sending the information back to the specified system memory location in response to detecting that the system has been restarted in a recovery mode.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
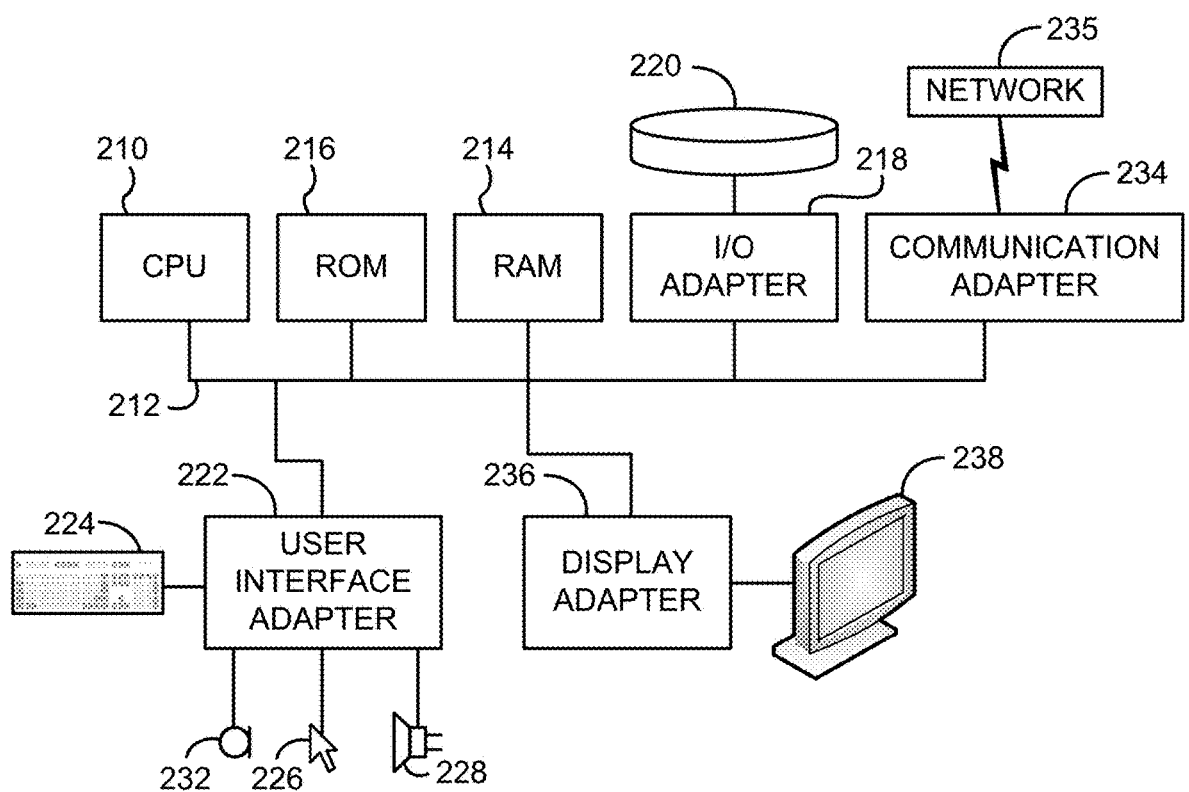
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
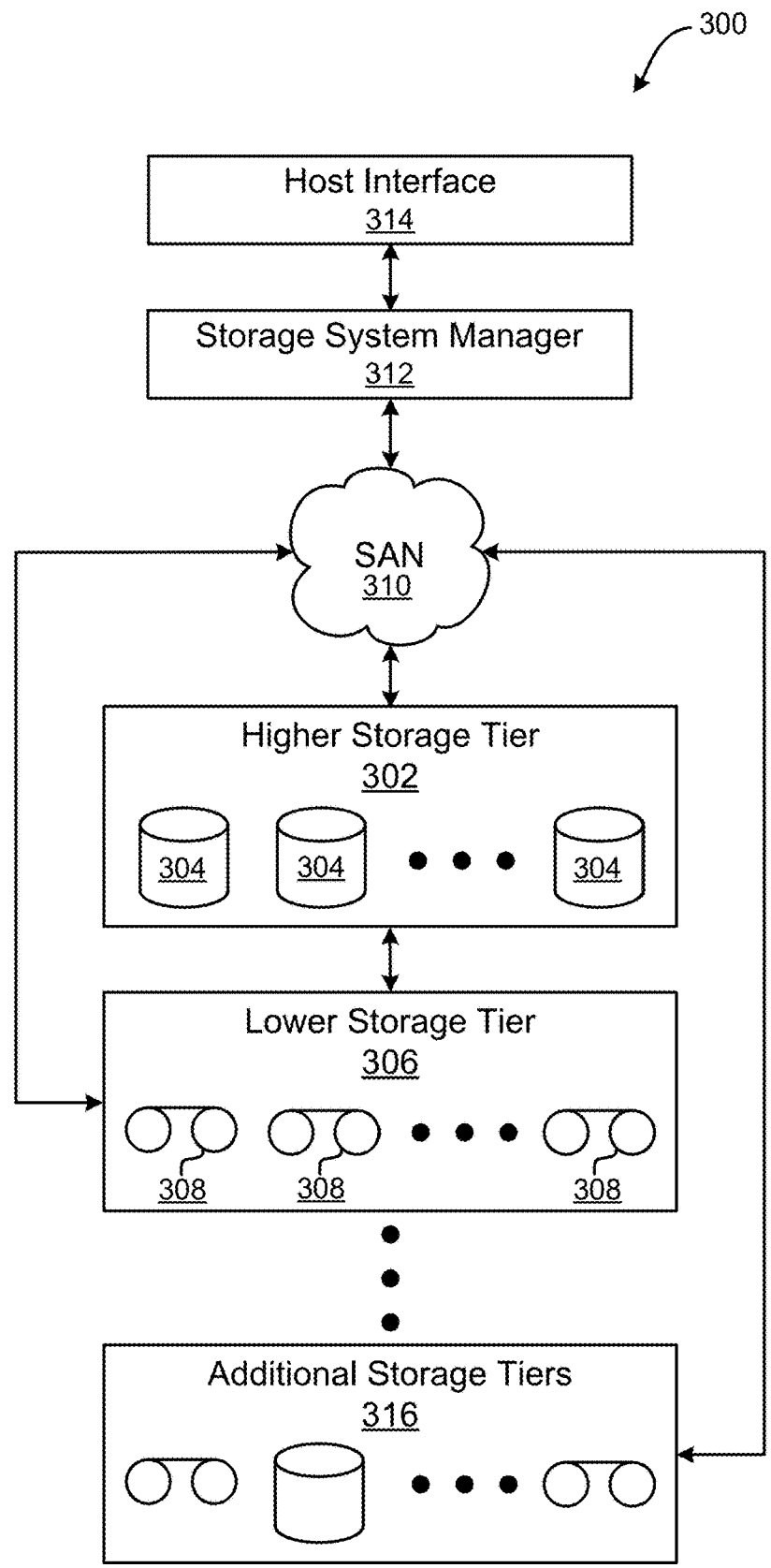
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (compact disc read-only memory (CD-ROM), digital versatile disk read-only memory (DVD-ROM), etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously described, enterprise storage products are typically subjected to an extremely high reliability and data integrity standards. However, conventional storage products are unable to efficiently recover from fatal failure scenarios. For example, enterprise storage products with capacities in the PB range would take days, or even weeks, to recover from a back-up following a fatal failure scenario.

A storage product may suffer from two kinds of fatal failures which include: massive hardware components failures (e.g. massive components suffering from sudden power loss, overheating, etc.), and massive software components and/or node failures.

A software related failure may cause a process to halt. Traditionally, halted processes are considered dead and their online state is lost. This means that in order to resume the process, the storage product either starts over (refills) from scratch, or from a known point in time that was previously stored in resilient media. Attempts have been made to utilize recovery tools to repair a storage product and avoid recovering from back-ups. However, repairing a storage product using recovery tools is undesirable as well, as doing so typically result in substantial data and metadata loss. Efforts to overcome this loss by continually back-up the data and metadata to resilient storage imposes a severe performance penalty on the system, and in most cases is not even a viable option.

Alternatively, efforts have been made to periodically store a snapshot of the data and/or metadata in a storage product and subsequently use a latest snapshot to reconstruct the product after a failure event. However, all data and/or metadata created, updated, deleted, etc. between the point in time the latest snapshot was taken and the failure event occurred is permanently lost. Thus, depending on the frequency at which snapshots are taken, a significant amount of data and/or metadata may be lost for a given system.

Similarly, efforts have been made to back-up the memory and/or process states concurrently on an additional process that will track the state of the main process. The back-up is usually located on another server to provide additional resiliency. Although these efforts do provide additional resiliency, they come at a price to the user. Specifically, the user is taxed with additional processes and resources, communication between processes, delay in operation due to making inter-process updates, etc. Moreover, there is also a very real possibility that whatever caused the original process to halt will also cause the back-up process to halt, thereby essentially making the back-up void in such a scenario.

Further still, some conventional storage products implement a battery in order to reduce the probability of process halt events by allowing the server and the processes to shutdown properly in the event of power loss. Although this scheme may cope with power loss events, it provides no assistance in the event of process halts caused by software failures.

While it may be possible to design the hardware of a storage product such that the correlation of having multiple hardware failures is low (e.g. by installing separate power sources for each server), the nature of some software failures is such that the correlation between the failing software nodes can be high. In other words, the same software failure may trigger rolling node failures. In addition, conventional enterprise storage solutions are often made up of millions of lines of code which increases the probability of a software related failure compared to hardware based failures.

In sharp contrast to the various shortcomings experienced by conventional storage products, some of the embodiments described herein are able to recover a system from a massive software failure without having a user chose between product downtime during recovery and data loss/application inconsistency as experienced with conventional products. In other words, some of the embodiments included herein are able to provide loss-less system recovery processes, e.g., as will be described in further detail below.

Figure 4:
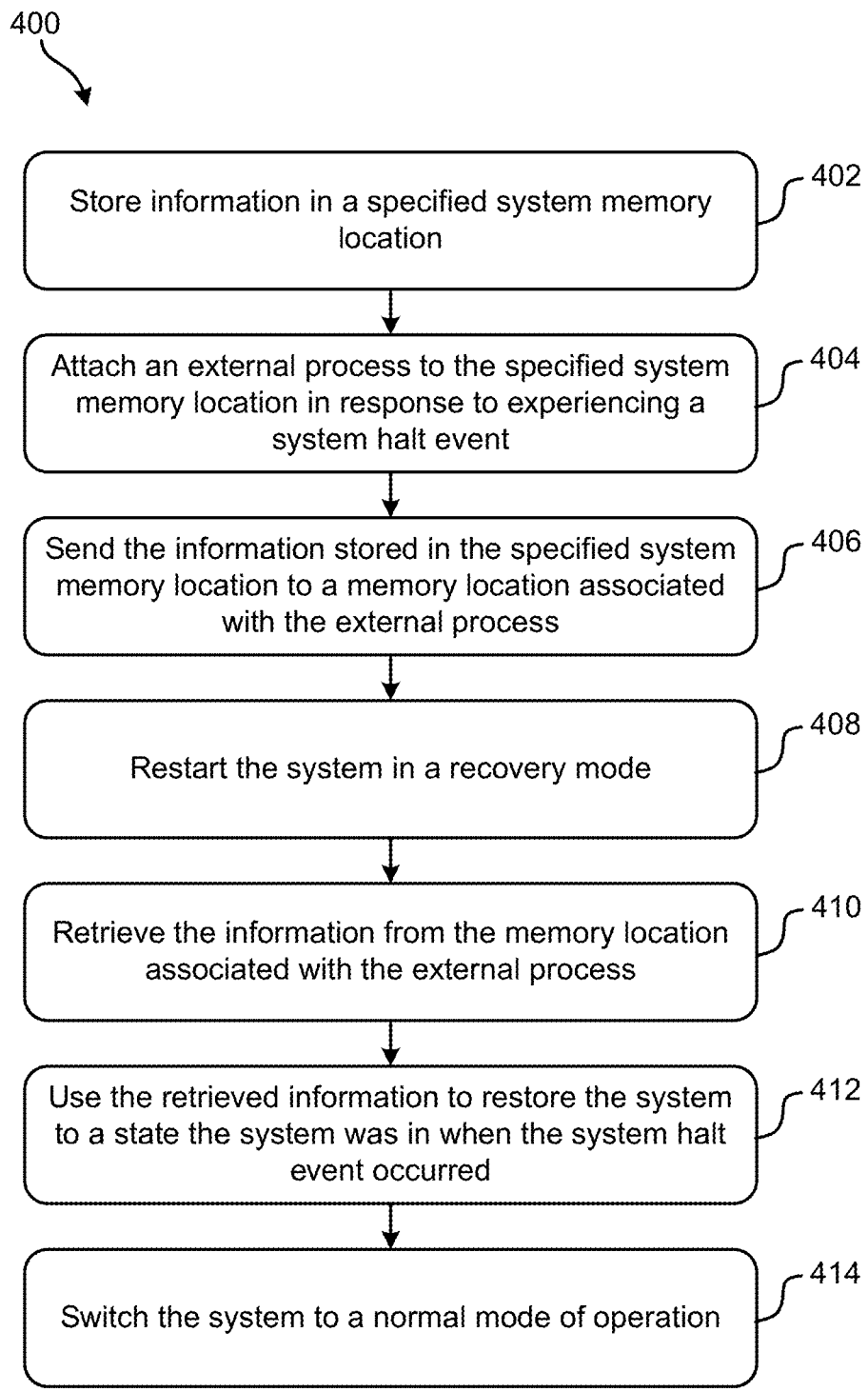
FIG. 4 is a flowchart of a method in accordance with one embodiment.

Now referring to FIG. 4, a flowchart of a computer-implemented method 400 for recovering from a system halt event, is shown according to one embodiment. According to different approaches, the system may be a data storage system, an operating system configured to run one or more processes, or any other type of system apparent to one skilled in the art after reading the present description. For instance, the system may include any type of application which stores information in RAM. Accordingly, it should be noted that method 400 may be performed by a computing component at (or at least coupled to) the system. Accordingly, the operations included in method 400 are described as being performed at and by the system. However, any one or more of the operations in method 400 may be performed in accordance with the present invention in any of the environments depicted in FIGS. 1-3, among others, in various embodiments. For instance, one or more of the operations included in method 400 may be performed by a processor at a location corresponding to an external process (e.g., see method 600 of FIG. 6A below). Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a CPU, an application specific integrated circuit (ASIC), a field programmable gate array (FPGA), etc., combinations thereof, or any other suitable computing device known in the art.

As shown in FIG. 4, operation 402 of method 400 includes storing information in a specified system memory location. As certain data is added to, updated in, removed from, etc. a system, the data itself, as well as metadata which corresponds to the data, are constantly changing. Thus, "information" stored in the specified system memory location preferably includes data and/or metadata (e.g., location information associated with the data), both of which correspond to the system. However, the type of information may vary depending on the type of system. For instance, in different approaches, the information may include data node and/or cache node metadata, write cache, or any other type of information which would be apparent to one skilled in the art after reading the present description. Moreover, the specified system memory location may be in RAM, thus the data included in the information may be cache data. However, according to various other approaches, the specified system memory location may be in any desired type of memory.

By storing this data and metadata in a specified system memory location, an embodiment having shared memory capability may be achieved. According to the present description, "shared memory" refers to memory or a namespace which may be attached to, inspected by, and/or accessed (e.g., used) by two or more different processors at two or more different locations. In some approaches, the processors may be central processing units (CPUs) which are part of an overarching multiprocessor computer system. In other approaches, the shared memory may be accessed by two or more processes which are run by two or more processors. Thus, the shared memory may be a location in the operating system memory which multiple processes are able to virtually map to concurrently. Accordingly, shared memory may allow the same memory to be accessed by more than one processor equipped with the specified system memory location, e.g., as will be described in further detail below.

It is also preferred that the information stored in the specified system memory location is protected. Protecting the information may reduce the risk of developing inconsistencies in the information and therefore increases the value of the information. According to one approach, the information may be protected by preventing updates from being performed on the information in the specified system memory location, thereby avoiding the possibility of the system experiencing a halt even during an update of the information and thereby causing the information to become corrupted. Moreover, accessing the information stored in the specified system memory location is preferably conducted in a transactional manner, e.g., such that processes are not left partially completed, multiple outstanding processes are not queued in a buffer, etc. Furthermore, in some approaches the state of the information may be arranged and managed separately from other parts of the system memory, e.g., to avoid any inconsistencies from arising.

With respect to the present description, a system memory location may be "specified" by being named and/or defined, e.g., by a physical address, logical address, identified confines of a particular region of memory, etc. Thus, in some approaches the specified system memory location may be a specified region in memory as would be appreciated by one skilled in the art after reading the present description. Information defining the specified system memory location may be predefined by a user, a system administrator, random selection, etc., and is preferably stored in memory itself (e.g., in a lookup table). Moreover, information defining the specified system memory location may be shared with other locations, or at least made available, thereby enabling the other locations to access the shared memory location and the information stored therein.

Referring still to method 400, operation 404 includes attaching an external process to the specified system memory location in response to experiencing a system halt event. As previously mentioned, a system may experience a halt event which causes the system to enter a failed state during which normal operations such as data reading and/or recording may not be performed. Moreover, the system is unable to save data and/or metadata included in the system memory when in a failed state following a halt event.

Halt events may result from various different situations, but generally are caused by failure situations which the system was not designed to be able to cope with. An exemplary list of system halt events, which is in no way intended to limit the invention, includes situations in which a software program is stuck in an infinite loop, there is at least partial power loss to the system, a sanity check is failed, a server did not shut down completely, data inconsistency which causes a segmentation fault, assertions caused by defensive programming which may be related to system sanity, etc. Moreover, it is preferred that the system halt event did not negatively affect (e.g., corrupt) the data and/or metadata corresponding to the system, or at least the state of the process. As a result, the data and/or metadata stored in the specified system memory location may be accessed by the external process and preferably used to later restore the system, e.g., as will be described in further detail below.

Once a system halt even has occurred, the system may remain "offline" or not in a normal operation state until the system is restored, e.g., by restarting the system. However, in order to restart the system without incurring data and/or metadata loss, it is preferred that the data and metadata stored in the specified system memory location be transferred or copied to a separate memory location. As alluded to above, systems may store data and/or metadata in RAM which is typically associated with volatile types of memory (e.g., such as Dynamic RAM (DRAM) memory modules) which is effectively erased (stored information is lost) if power to the memory is interrupted. Thus, by attaching an external process, or external script, to the specified system memory location after a system halt event has occurred, the external process may access the data and metadata stored therein by utilizing the shared memory. Moreover, the data and metadata stored in the specified system memory location represents the state of the system at the time the halt even occurred, assuming the halt event did not negatively affect the data and/or metadata, e.g., as a result of a system-wide power outage. By retaining at least a copy of the data and metadata even after the system has been restarted, the system may be restored to a state which corresponds to a point in time when the halt event actually occurred. Therefore, is also preferred that the information is not changed following the halt event and therefore new I/O operations, destage processes, metadata operations, etc. are preferably not implemented while the system is offline. The foregoing achievements are significant improvements over conventional storage products which lose some, if not all, data and metadata in response to a halt event occurring.

An external process may be attached to the specified system memory location if the memory location is defined and/or named, e.g., as would be apparent to one skilled in the art after reading the present description. In other words, the information stored in the specified system memory location may be accessed by more than one process. Once allocated, a specified system memory location may be added to a memory page table of the process attempting to attach thereto, e.g., using a shared-memory attach system call. As a result, a shared memory segment may be a part of the address space of the process, although the actual address of the segment may be different. For instance, the starting address of a shared memory segment in the address space of a first process may be different from the starting address of the shared memory segment in the address space of a second process.

In some approaches, the external process may be attached automatically in response to the system halt even occurring. In other approaches, a request may be sent to a processor implementing the external process, whereby the processor may initiate the attachment of the external process to the specified system memory location. In other words, the process of actually attaching the external process to the specified system memory location may be implemented differently depending on the desired embodiment. According to some approaches, the external process may be a process recovery tool which is connected to a data/cache node memory using the name space of the memory location. The name space may be based on a known identifier for cache descriptors in some instances.

Furthermore, operation 406 of method 400 includes sending the information (data and metadata) stored in the specified system memory location to a memory location associated with the external process. It should be noted that the information sent to the memory location associated with the external process is selected to include the relevant information which may be later used to recover the system. In other words, the information copied aside may be selective and may only include the information relevant to perform a system recovery procedure according to any of the approaches described herein. Thus, in preferred approaches, operation 406 may not include sending all the registers and/or the memory generally contained in a core file.

Again, the external process may be performed by a processor in response to a system halt even occurring. Accordingly, the external process and memory location associated therewith, are preferably removed enough from the system that they are not negatively affected by the system halt event. For example, the external process may be performed by a processor which is geographically separated from the system location, and coupled to the specified system memory location via a wireless network connection.

It follows that the memory location where the data and metadata from the specified system memory location is sent is also preferably removed (e.g., geographically) from the system location. Thus, the data and metadata may be securely retained in the memory location associated with the external process while the system is restarted in order to recover from the system halt event and eventually return to a normal operating mode. However, it should be noted that the memory location associated with the external process is not so removed from the system that a connection cannot be made between the system and the external process and/or the memory location associated therewith. It is desirable that the information may be sent back to the system from the memory location associated with the external process in order to restore the system, e.g., as will be described in further detail below.

Accordingly, once the data and metadata from the system have been transitioned to the memory location associated with the external process, operation 408 includes restarting the system in a recovery mode. In the recovery mode, certain features and/or functions of the system may be deactivated. For example, the system may not be able to receive or perform I/O operations when functioning in recovery mode. However, in some approaches I/O operations may be received and stored in a buffer, e.g., to be performed after the system has been returned to a normal mode of operation. By deactivating certain features and/or functions, the system may be able to recover and return to a state the system was in at the point in time the halt event occurred without being prompted with any other operations. This may prevent the halt event from repeating at the system, e.g., particularly in the case of software-based halt events.

Furthermore, by restarting the system, data and metadata stored in certain types of memory is lost as a result of the supply power being cut during the restart process. For example, data and/or metadata stored in volatile memory such as DRAM, static RAM (SRAM), etc. is lost as a result of interrupting the power supplied to the volatile memory as a part of the restart process. It may therefore be desirable to reconstruct the data and/or metadata previously included in the memory as a result of restarting the system in a recovery mode before performing additional operations.

Accordingly, once the system is in recovery mode, method 400 includes retrieving the information from the memory location associated with the external process. See operation 410. In some approaches, a request for the information (data and/or metadata) may be sent to the memory location associated with the external process. In response to receiving the request, the external process may send the information back to the system via a connection existing therebetween, make the information available (e.g., unlocked) and the system may subsequently extract the information, provide the system with the location where the information is stored, etc. In other approaches, the external process may automatically detect when the system has been restarted in recovery mode and may send the information in response to making such a detection, the external process may simply inform the system that the information is ready for retrieval, etc.

Moreover, once the information has been retrieved by the system from the memory location associated with the external process, operation 412 includes using the retrieved information to restore the system to a state the system was in when the system halt event occurred. In other words, the retrieved information may be used to repopulate the system memory and/or destaged to storage. When the halt event occurs, there is no organized state in which the information is stored. Thus, sending the information to the memory location associated with the external process and using the retrieved information to restore the system are performed differently. The information may be loaded into memory and/or replayed as I/O operations, e.g., as will be described in further detail below.

Once the system has been restored to a memory state the system was in when the halt event occurred, operation 414 includes switching the system to a normal mode of operation. Once in a normal mode of operation, the system may be able to receive and/or perform I/O operations, initiate and/or perform programs, etc., depending on system configurations. As previously mentioned, the system may be a data storage system which is capable of receiving, storing, reading, etc. data. However, in other approaches the system may be an operating system configured to run one or more processes. It follows that any one or more of the operations and sub-processes described herein may be performed on different types of relevant (e.g., compatible) systems, e.g., depending on the desired approach.

Figure 5A:
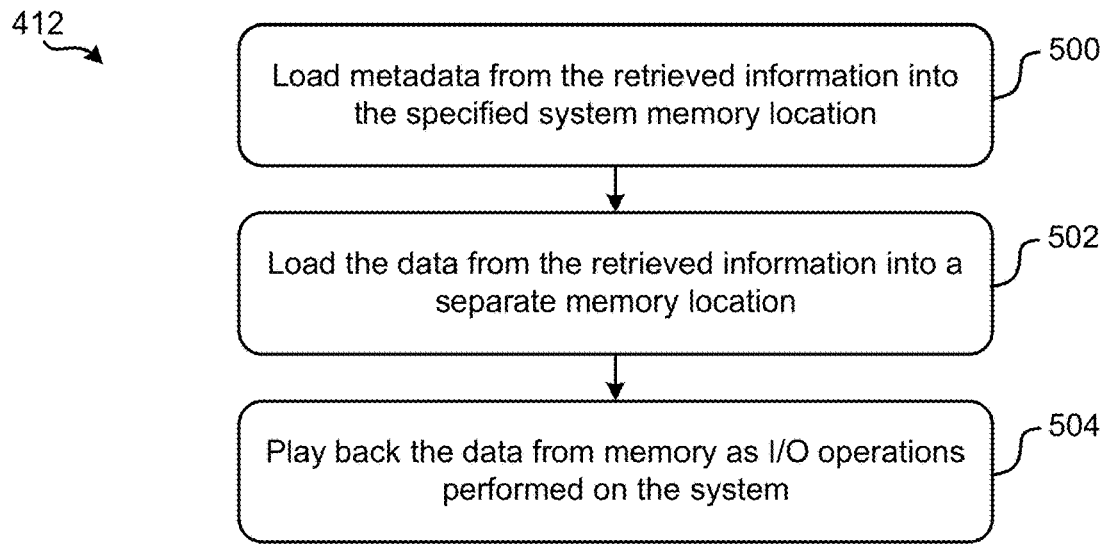
FIG. 5A is a flowchart of sub-processes for performing one of the operations of the method of FIG. 4.

Looking now to FIG. 5A, exemplary sub-processes of using the retrieved information to restore the system are illustrated in accordance with one embodiment, one or more of which may be used to perform operation 412 of FIG. 4. However, it should be noted that the sub-processes of FIG. 5A are illustrated in accordance with one embodiment which is in no way intended to limit the invention.

As mentioned above, the information retrieved from the external process may include data as well as metadata which corresponds to the data. Accordingly, sub-operation 500 includes loading metadata from the retrieved information into the specified system memory location. The same specified system memory location used prior to the halt event may be reused to store the metadata, but in some approaches a different system memory location may be specified (e.g., defined and named) as a result of experiencing the halt event. The metadata may be loaded into the specified system memory location by transferring the metadata files to the memory location as would be appreciated by one skilled in the art after reading the present description. Moreover, upon loading the metadata into the specified system memory location, the metadata state of the process may be recovered. In some approaches, the metadata state of the process may be recovered by implementing a recovery function which allows the system to read and/or implement the information such that the system returns to the state it was in just as the halt event occurred, e.g., as would be appreciated by one skilled in the art after reading the present description.

Referring still to FIG. 5A, sub-operation 502 includes loading the data from the retrieved information into a separate memory location, while sub-operation 504 includes playing back the data from the separate memory location as I/O operations performed on the system. According to one approach, the separate memory location may be located in RAM, but may be located in any type of memory depending on the desired approach. By playing back the data as I/O operations performed on the system, the data may be used to repopulate the specified system memory location and thereby return the system to a state the system was in when the halt event occurred. According to an exemplary approach, which is in no way intended to limit the invention, information stored in one or more files at the memory location associated with the external process may be played back by running a remote procedure call in a node that receives the name(s) of the one or more files. Information may thereby be read from the one or more files and internally handled by the system as a standard I/O operation.

As previously mentioned, these achievements are significant improvements over conventional products which lose all data and metadata changes since a last snapshot of the system memory was taken, or lose the data and metadata altogether as a result of the halt event. Accordingly, various embodiments described herein are able to significantly improve the process of recovering from a system halt event.

In some situations, the data and/or metadata stored in the specified system memory location may be corrupted, e.g., as a result of the system halt event. Thus, inconsistencies may form in the data and/or metadata before it is sent to the memory location associated with the external process in response to the system halt event occurring. It follows that it may be desirable to examine the data and/or metadata before it is reimplemented in the storage system after the system has been restarted in recovery mode. Examining the data and/or metadata may prevent any inconsistencies from being transferred back to the system after the system has been restarted and restored (e.g., see operation 412 above).

According to some approaches the data and/or metadata may be examined at the storage system. For instance, the information may be examined while it is stored in the separate memory location and before it is used to restore the system. In other approaches, the information may be examined as it is received from the memory location associated with the external process and before it is stored in the separate memory location. Accordingly, looking now to FIG. 5B, exemplary sub-processes of retrieving the information from the memory location associated with the external process are illustrated in accordance with one embodiment, one or more of which may be used to perform operation 410 of FIG. 4. However, it should be noted that the sub-processes of FIG. 5B are illustrated in accordance with one embodiment which is in no way intended to limit the invention.

Decision 550 includes determining whether any inconsistencies exist in the retrieved information. In some approaches, inconsistencies in the retrieved information may correspond to whether the information is in-tact after the halt event occurred. In other words, the manner in which the halt event caused the system to stop may have an effect on whether inconsistencies exist in the retrieved information. This determination may be made at any point after a halt event occurs. However, it is preferred that decision 550 is performed after the information has been returned to the system. According to one approach, decision 550 may be performed as a part of a recovery process which loops between descriptors which include data concerning which partition, disk, block, etc. of memory the retrieved information has been stored in the system. Moreover, for each descriptor, the integrity of the corresponding information may be checked in order to determine whether any inconsistencies exist.

Figure 5B:
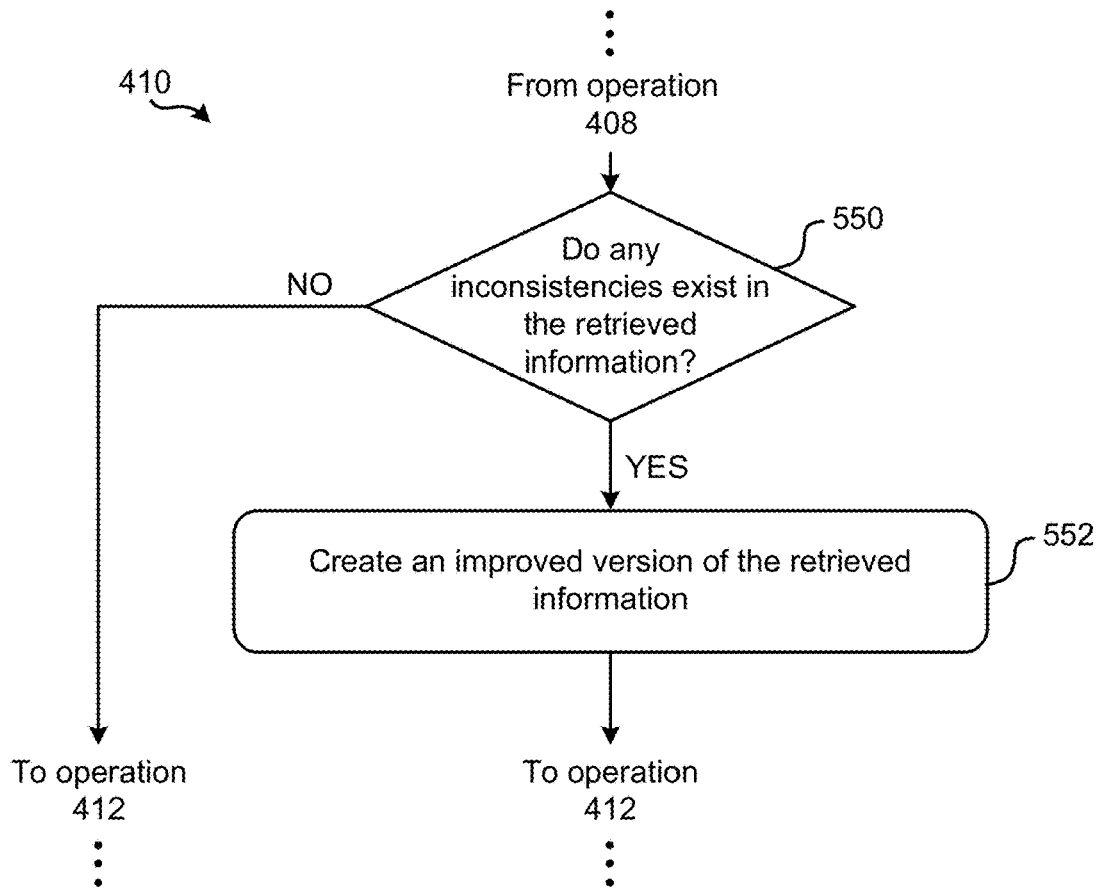
FIG. 5B is a flowchart of sub-processes for performing one of the operations of the method of FIG. 4.

As shown, the flowchart of FIG. 5B returns to operation 412 in response to determining that no inconsistencies exist in the retrieved information. Accordingly, the data and metadata included in the information retrieved from the memory location associated with the external process may be used to reconstruct the system as described above.

Alternatively, FIG. 5B proceeds to sub-operation 552 in response to determining that at least one inconsistency does exist in the retrieved information. There, sub-operation 552 includes creating an improved version of the retrieved information. An improved version of the retrieved information may be created by first analyzing the information. According to some approaches, the information may be analyzed by determining the integrity of the information. In other approaches, the information may be analyzed by comparing it to anticipated values, checking if the information complies with standards associated with the system, determining whether an overall size (amount of memory) of the information matches a size of the information prior to the halt event occurring, etc.

After it is created, the improved version of the retrieved information is preferably used to restore the system rather than the version of the information retrieved directly from the memory location associated with the external process. By doing so, any inconsistencies in the information are not retained after transitioning the information back to the specified system memory location. Thus, although FIG. 5B shows the flowchart proceeding to operation 412 after sub-operation 552 has been performed, it should be noted that the improved version of the retrieved information is preferably used moving forward in operations 412 and 414 when applicable. In other words, the "retrieved information" used to restore the system in operation 412 may include the information retrieved directly from the memory location associated with the external process, or the improved version of the retrieved information, e.g., depending on whether inconsistencies are determined to be in the information.

Although it may be desirable in some approaches that the data and/or metadata is examined at the system, e.g., after it has been received from the memory location associated with the external process, it should be noted that the information may be examined for inconsistencies differently according to various other approaches. For instance, in some approaches, the data and/or metadata may be examined at the memory location associated with the external process prior to being returned to the specified system memory location, e.g., as will be described in further detail below.

As mentioned above, the operations and/or sub-processes included herein may be performed in accordance with the present invention in any of the environments depicted in FIGS. 1-3, among others, in various embodiments. Thus, looking now to FIG. 6A, a flowchart of a computer-implemented method 600 for helping recover a system from a halt event, is shown according to one embodiment. According to different approaches, the system may be a data storage system, an operating system configured to run one or more processes, or any other type of system apparent to one skilled in the art after reading the present description. For instance, the system may include any type of application which stores information in RAM. However, it should be noted that method 600 is preferably performed by a computing component at (or at least coupled to) a location corresponding to the external process. Accordingly, the operations included in method 600 are described as being performed at the location corresponding to the external process. Moreover, it should be noted that more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an application specific integrated circuit (ASIC), a field programmable gate array (FPGA), etc., combinations thereof, or any other suitable computing device known in the art.

Figure 6A:
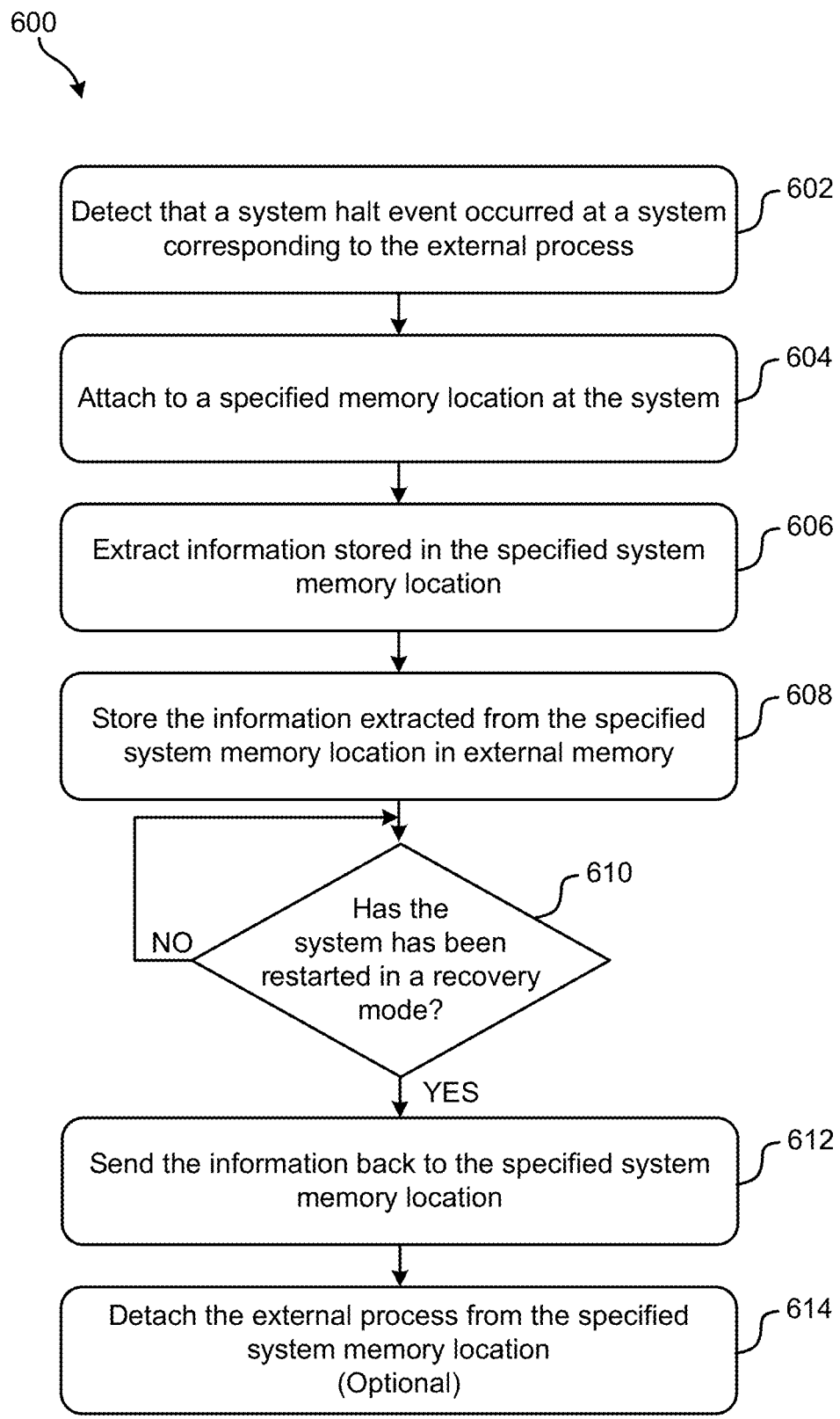
FIG. 6A is a flowchart of a method in accordance with one embodiment.

As shown in FIG. 6A, operation 602 of method 600 includes detecting that a system halt event occurred at a system corresponding to the external process. Moreover, in response to making such a detection, operation 604 includes attaching to a specified memory location at the system. As described above, a system memory location may be specified by being named and/or defined, e.g., by a physical address, logical address, identified confines of a particular region of memory, etc. Thus, in some approaches the specified system memory location may be a specified region in memory as would be appreciated by one skilled in the art after reading the present description. Information defining the specified system memory location may be predefined by a user, a system administrator, random selection, etc., and is preferably stored in memory itself (e.g., in a lookup table). Moreover, information defining the specified system memory location may be shared with other locations, or at least made available, thereby enabling the other locations to access the shared memory location and the information stored therein. Accordingly, the external process may attach (or be attached) to the specified system memory location by using the information defining the memory location's name, location, memory type, etc., despite the external process being external to (e.g., physically removed from) the system.

In some approaches, the external process may attach to the specified system memory location via a wireless connection such as a wireless Internet connection, a wide area network (WAN), a Broadband Global Area Network (BGAN), a LAN, etc. In other approaches, the external process may attach to the specified system memory location via a wired network connection such as an Ethernet connection, a fiber-optic connection, etc.

With continued reference to method 600, operation 606 includes extracting information stored in the specified system memory location. As described above, "information" may at least include data and/or metadata (e.g., location information associated with the data), both of which correspond to the system. According to one approach, the external process may extract the information by reading the information and creating a copy of the information, whereby the copy of the information may be further used by the external process. Moreover, the information may remain in the specified system memory location after it has been extracted by the external process in some approaches. However, in other approaches the external process may delete the information from the specified system memory location after it has been extracted, the system itself may delete the information after it has been extracted, the information may be indicated as invalid to be overwritten during a next garbage collection operation, etc.

Moreover, operation 608 includes storing the information extracted from the specified system memory location in local memory. It should be noted that the term "local memory" is preferably with respect to the external process itself rather than the system. Thus, in different approaches, the extracted information may be stored in different mediums associated with (and preferably accessible by) the external process, which may include magnetic disk, a solid state drive, one or more file locations, etc. As described above, the local memory is preferably removed enough from the system that it is not at risk of being affected by system halt events, but is preferably close enough (geographically and/or logically) to the system that establishing a connection therebetween is likely. Storing the data and/or metadata in the local memory may be achieved by writing the information according to the memory format. For example, information stored in local SSD memory may be sent to a buffer in a SSD controller. According to another example, storing information on a magnetic disk may include implementing a disk_dd command or any other disk write utility which would be apparent to one skilled in the art after reading the present description.

Decision 610 includes determining whether the system has been restarted in a recovery mode. As described above, a system is preferably restarted in a recovery mode after a halt event occurs, e.g., in order to reconstruct the system, but preferably not until after any desired data is transitioned to a secure memory location. For instance, data stored in volatile memory may be lost as a result of restarting the system, as doing so may terminate the power supplied to the memory at least momentarily. Whether the system has been restarted in a recovery mode may be determined in a number of different ways. For example, in some approaches, the external process may detect that the system has been restarted in a recovery mode as a result of receiving a request from the system for the information. Thus, it should be noted that method 600 may alternatively wait to receive a request from the system for the data/metadata, and then send the information in response to receiving the request. In other approaches, the external process may determine that the system has been restarted in recovery mode as a result of the system attempting to reconnect to the external process via a wired and/or wireless connection during a reboot process of the system, or any other way of making such a determination as would be apparent to one skilled in the art after reading the present description.

As shown, method 600 includes sending the information back to the specified system memory location in response to determining (e.g., detecting) that the system has been restarted in a recovery mode. See operation 612. Again, once the system has been restarted in a recovery mode, the data and/or metadata previously included therein may be used to restore the system to a state the system was in at the point in time the halt event occurred, e.g., according to any of the approaches described above. In other approaches, the information may be sent to one or more files and/or memory location the system accesses in response to being restarted in a recovery mode, and the system itself may reimplement the information in the specified memory location from the one or more files and/or memory location. Moreover, after all of the information has been sent back to the system, method 600 may include detaching the external process from the specified system memory location. See optional operation 614. It should also be noted that although operation 612 includes sending the information back to the system, in other embodiments the system may initiate the transfer of and/or effectively pull the information from the memory associated with the external process.

However, returning to decision 610, method 600 continues to loop back and perform decision 610 in response to each time it is determined that the system has not been restarted in a recovery mode. It may be undesirable to send the information back to the system before it has been restarted in a recovery mode as doing so may cause the information to be lost once the system is restarted. For instance, in some approaches the specified system memory location may be in RAM. According to different approaches, method 600 may wait a predetermined amount of time, until a user input is received, until a condition has been met, etc., before decision 610 is performed again after it is determined that the system has not been restarted in a recovery mode. As a result, method 600 may avoid unnecessary resource consumption which may otherwise result from performing decision 610 at too high of a frequency.

Again, in some approaches it may be desirable that the information is examined for inconsistencies at the memory location associated with the external process (e.g., by the external process) before being stored and/or returned to the specified system memory location. Looking to FIG. 6B, exemplary sub-processes of extracting information stored in the specified system memory location are illustrated in accordance with one embodiment, one or more of which may be used to perform operation 606 of FIG. 6A. However, it should be noted that the sub-processes of FIG. 6B are illustrated in accordance with one embodiment which is in no way intended to limit the invention.

Decision 650 includes determining whether any inconsistencies exist in the extracted information. In some approaches, inconsistencies in the retrieved information may correspond to whether the information is in-tact after the halt event occurred. In other words, the manner in which the halt event caused the system to stop may have an effect on whether inconsistencies exist in the retrieved information. This determination may be made at any point during and/or after the information has been extracted from the specified system memory location by the external process following a halt event. According to one approach, decision 650 may be performed as a part of a recovery process which loops between descriptors which include data concerning which partition, disk, block, etc. of memory associated with the external process the extracted information has been stored in. Moreover, for each descriptor, the integrity of the corresponding information may be checked in order to determine whether any inconsistencies exist.

Figure 6B:
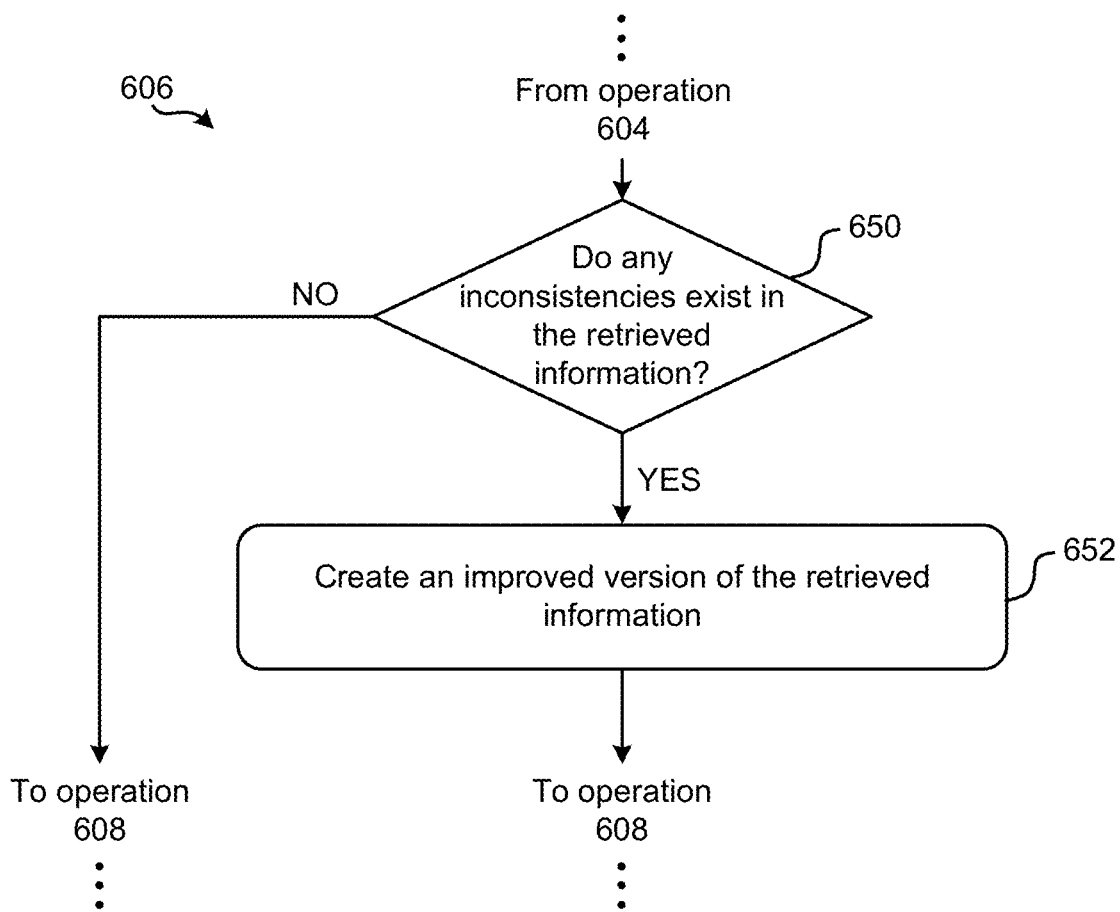
FIG. 6B is a flowchart of sub-processes for performing one of the operations of the method of FIG. 6A.

As shown, the flowchart of FIG. 6B returns to operation 608 in response to determining that no inconsistencies exist in the extracted information. Accordingly, the data and metadata included in the information extracted from the specified system memory location may be stored in a memory location associated with the external process, and may later be used to reconstruct the system according to any of the approaches described herein.

Alternatively, FIG. 6B proceeds to sub-operation 652 in response to determining that at least one inconsistency does exist in the extracted information. There, sub-operation 652 includes creating an improved version of the extracted information. An improved version of the extracted information may be created by first analyzing the information. According to different approaches, the information may be analyzed by determining the integrity of the information, comparing it to anticipated values, checking if the information complies with standards associated with the system, determining whether an overall size (amount of memory) of the information matches a size of the information prior to the halt event occurring, etc.

After it is created, the improved version of the extracted information is preferably stored in the memory location associated with the external process rather than the version of the information directly extracted from the specified system memory location. By doing so, any inconsistencies in the information are not retained after the information is extracted and/or transitioned back to the specified system memory location during a recovery process. Thus, although FIG. 6B shows the flowchart proceeding to operation 608 after sub-operation 652 has been performed, it should be noted that the improved version of the retrieved information is preferably used moving forward in method 600 when applicable. In other words, the "information" sent back to the specified system memory location in operation 612 may include the information extracted directly from the specified system memory location, or the improved version of the extracted information, e.g., depending on whether inconsistencies are determined to be in the information during the extraction process.

It follows that various embodiments described herein are able to recover a system following a halt event, e.g., by attaching to the halted system using an external process. Moreover, the external process is able to attach to a specified memory location in the system and extract the information (data and/or metadata) stored in the specified memory location to another storage location which preferably corresponds to the external process. By doing so, the system may be restarted in a recovery mode without losing any of the information from the specified system memory location. Once in a recovery mode, the system may regain access to the information and use it to reform the system to a state it was in at the time the halt event occurred, thereby desirably avoiding any loss of data and/or metadata from the system as a result of a halt event occurring. In other words, some of the embodiments included herein are able to achieve loss less process state and memory recovery procedures.

Any one or more of the embodiments described herein may be performed on each halted (failed) data/cache node, preferably in order to ultimately recover the entire system to a state the system was in just as the halt event occurred. Moreover, the operations and/or sub-processes included herein may be initiated by an individual (e.g., a system administrator, a user, etc.) in response to detecting that a halt event has occurred at the system, or initiated automatically (e.g., by the system, the external process, a system management controller, etc.) in response to a halt event occurring.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
storing information in a specified system memory location;
attaching an external process to the specified system memory location in response to experiencing a system halt event;
sending the information stored in the specified system memory location to a memory location associated with the external process;
restarting the system in a recovery mode;
retrieving the information from the external process; and
using the retrieved information to restore the system to a state the system was in when the system halt event occurred.

2. The computer-implemented method of claim 1, wherein the system is a data storage system.

3. The computer-implemented method of claim 1, wherein the system is an operating system configured to run one or more processes.

4. The computer-implemented method of claim 1, wherein the specified system memory location is in random access memory.

5. The computer-implemented method of claim 1, wherein the information includes data and metadata.

6. The computer-implemented method of claim 5, wherein using the retrieved information to restore the system includes:
loading metadata into the specified system memory location;
loading data into random access memory; and
playing back the data as input/output operations performed on the system.

7. The computer-implemented method of claim 1, wherein retrieving the information from the external process includes:
determining whether any inconsistencies exist in the retrieved information; and
creating an improved version of the retrieved information in response to determining that an inconsistency does exist in the retrieved information,
wherein the improved version of the retrieved information is used to restore the system.

8. A computer program product comprising a computer readable storage medium having program instructions embodied therewith, wherein the computer readable storage medium is not a transitory signal per se, the program instructions readable and/or executable by a processor to cause the processor to perform a method comprising:

storing, by the processor, information in a specified system memory location;

attaching, by the processor, an external process to the specified system memory location in response to experiencing a system halt event;

sending, by the processor, the information stored in the specified system memory location to a memory location associated with the external process;

restarting, by the processor, the system in a recovery mode;

retrieving, by the processor, the information from the external process; and using, by the processor, the retrieved information to restore the system to a state the system was in when the system halt event occurred.

9. The computer program product of claim 8, wherein the system is a data storage system.

10. The computer program product of claim 8, wherein the system is an operating system configured to run one or more processes.

11. The computer program product of claim 8, wherein the specified system memory location is in random access memory.

12. The computer program product of claim 8, wherein the information includes data and metadata.

13. The computer program product of claim 12, wherein using the retrieved information to restore the system includes:

loading, by the processor, metadata into the specified system memory location;

loading, by the processor, data into random access memory; and playing, by the processor, back the data as input/output operations performed on the system.

14. The computer program product of claim 8, wherein retrieving the information from the external process includes:

determining, by the processor, whether any inconsistencies exist in the retrieved information; and creating, by the processor, an improved version of the retrieved information in response to determining that an inconsistency does exist in the retrieved information, wherein the improved version of the retrieved information is used to restore the system.

15. A computer-implemented method, comprising:

attaching to a specified system memory location in response to detecting that a system halt event occurred at the system;

extracting information stored in the specified system memory location;

storing the information in local memory; and sending the information back to the specified system memory location in response to detecting that the system has been restarted in a recovery mode.

16. The computer-implemented method of claim 15, wherein the information includes data and metadata.

17. The computer-implemented method of claim 15, wherein the specified system memory location is in random access memory.

18. The computer-implemented method of claim 15, comprising:

determining whether any inconsistencies exist in the information; and creating an improved version of the information in response to determining that an inconsistency does exist in the information, wherein storing the information in local memory includes storing the improved version of the information in the local memory, wherein sending the information back to the specified system memory location includes sending the improved version of the information back to the specified system memory location.

19. The computer-implemented method of claim 15, wherein the local memory is selected from a group consisting of magnetic disk, a solid state drive, and one or more file locations.

20. The computer-implemented method of claim 15, comprising:

detaching from the specified system memory location, wherein the system is a data storage system or an operating system configured to run one or more processes, wherein the halt event is caused by a hardware and/or software related failure event.

* * * * *